US012583536B2

(12) United States Patent
Kübler et al.

(10) Patent No.: US 12,583,536 B2
(45) Date of Patent: Mar. 24, 2026

(54) FIFTH-WHEEL COUPLING HAVING SECURING APPARATUS

(71) Applicant: SAF-HOLLAND GmbH, Bessenbach (DE)

(72) Inventors: Randy Kübler, Gottmadingen (DE); Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 632 days.

(21) Appl. No.: 17/998,409

(22) PCT Filed: May 11, 2021

(86) PCT No.: PCT/EP2021/062462
§ 371 (c)(1),
(2) Date: Nov. 10, 2022

(87) PCT Pub. No.: WO2021/228843
PCT Pub. Date: Nov. 18, 2021

(65) Prior Publication Data
US 2023/0174174 A1      Jun. 8, 2023

(30) Foreign Application Priority Data

May 12, 2020    (DE) ........................ 10 2020 112 815

(51) Int. Cl.
*B62D 53/10* (2006.01)
*B62D 53/08* (2006.01)
(52) U.S. Cl.
CPC ......... *B62D 53/10* (2013.01); *B62D 53/0842* (2013.01)

(58) Field of Classification Search
CPC ............................ B62D 53/10; B62D 53/0842
See application file for complete search history.

(56) References Cited

U.S. PATENT DOCUMENTS

| | | | | |
|---|---|---|---|---|
| 6,092,825 A | * | 7/2000 | Flater ..................... | B62D 53/12 |
| | | | | 280/433 |
| 12,172,713 B2 | * | 12/2024 | Köster ................... | B62D 53/10 |

FOREIGN PATENT DOCUMENTS

| | | | | | |
|---|---|---|---|---|---|
| CN | 113022724 A | * | 6/2021 | ......... | B62D 53/0807 |
| DE | 564371 C | | 11/1932 | | |

(Continued)

OTHER PUBLICATIONS

European Patent Office; International Search Report; Jul. 28, 2021; entire document.

(Continued)

*Primary Examiner* — Faye M Fleming
(74) *Attorney, Agent, or Firm* — Price Heneveld LLP

(57) ABSTRACT

A fifth wheel coupling includes a fifth wheel coupling plate having a bearing surface having a normal and an retraction opening for a king pin and configured to prevent the king pin from being moved out of the retraction opening when in a closed position, and allow the king pin to be moved out of the retraction opening when in an open position, an actuating device having an actuating area extending along a longitudinal axis and configured to transfer the locking mechanism from the closed position to the open position, and a transmission area configured to transfer forces to the locking mechanism, and a safety device including a locking arrangement pivotably mounted about a pivot axis such that the locking arrangement can be moved into a locking position and into a release.

20 Claims, 3 Drawing Sheets

(56)            References Cited

FOREIGN PATENT DOCUMENTS

| | | | |
|---|---|---|---|
| DE | 1256081 | B | 12/1967 |
| DE | 3803931 | A1 | 8/1989 |
| DE | 19516101 | A1 | 11/1996 |
| DE | 19820139 | A1 | 11/1999 |
| DE | 10341019 | A1 | 3/2005 |
| DE | 102008000799 | A1 | 10/2009 |
| EP | 0994012 | A1 | 4/2000 |
| IE | 20130052 | A1 * | 2/2013 |
| WO | 2003043838 | A2 | 5/2003 |

OTHER PUBLICATIONS

YouTube video "Jost Trainingsvideo Sattelkupplungen"; https://www.youtube.com/watch?v=KqzVy_Nji9s, published on Nov. 7, 2018.

* cited by examiner

<u>Fig. 1</u>
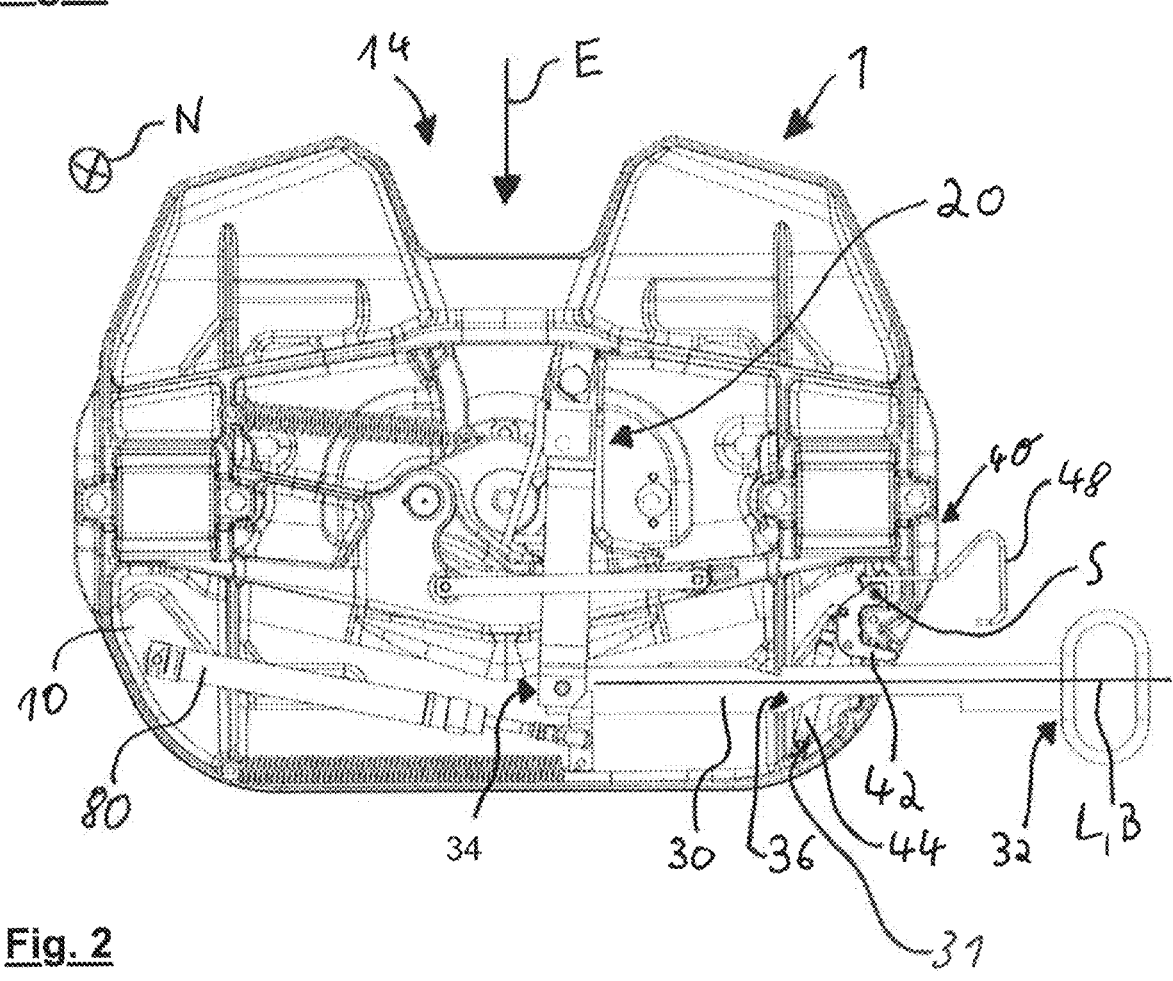
<u>Fig. 2</u>
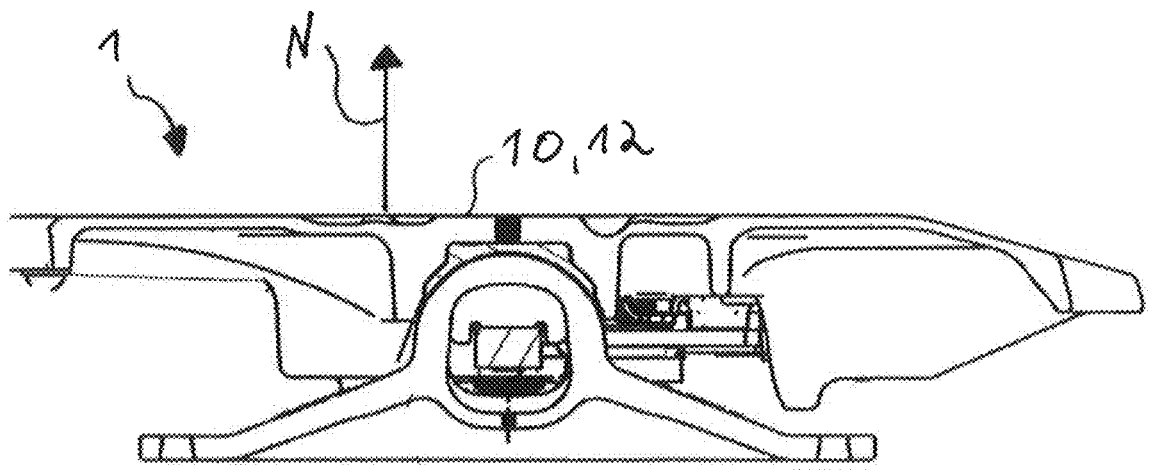

FIFTH-WHEEL COUPLING HAVING SECURING APPARATUS

BACKGROUND OF THE INVENTION

The invention relates to a fifth wheel coupling with a safety device.

Fifth wheel couplings are already known from the prior art and are used to connect a towing vehicle to a trailer, in particular to a semitrailer. For this purpose, a king pin of the trailer is inserted into the entry opening of the fifth wheel coupling and then held there by a locking mechanism in such a way that the king pin can no longer be guided out of the entry opening, so that coupling or towing forces can be transmitted between the towing vehicle and the trailer. In order to be able to remove the king pin from the fifth wheel coupling again, the locking mechanism is usually opened by an operating handle. In order to prevent unintentional or incorrect actuation of this actuating handle, it is known to provide a safety device. However, these known safety devices are usually prone to error and can easily be released unintentionally, in particular by vibrations.

It is therefore the object of the present invention to provide a fifth wheel coupling which provides a high degree of safety.

SUMMARY OF THE INVENTION

According to the invention, a fifth wheel coupling comprises a fifth wheel coupling plate, a locking mechanism, an actuating device and a safety device, wherein the fifth wheel coupling plate has a bearing surface and a retraction opening for a king pin, wherein the bearing surface has a normal, wherein the retraction opening extends in a retraction direction, wherein the locking mechanism is designed in such a way such that, in a closed position, it prevents the king pin from being extended out of the retraction opening in a medium- and/or direct-locking manner, and wherein the locking mechanism, in an open position, allows the king pin to be extended out of the retraction opening, wherein the actuating device has an actuating region, in particular a handle, and a transmission region wherein the actuating device extends along a longitudinal axis, wherein the actuating device is designed to transfer the locking mechanism from the closed position to the open position, in particular by a displacement of the actuating device in an actuating direction, wherein the transfer area is designed to transfer forces and/or moments indirectly or directly to the locking mechanism, wherein the safety device comprises a locking means, wherein the locking means is mounted, in particular pivotably about a pivot axis, in such a way that the locking means can be moved into a locking position and into a release position, wherein the locking means in the locking position prevents transfer of the locking mechanism from the closed position into the open position in a medium- locking and/or direct-locking manner. The fifth wheel coupling according to the invention is intended to be or is mounted on a first vehicle, in particular a towing vehicle, and to transmit coupling forces between the first vehicle and the trailer in interaction with a king pin of a trailer, in particular a semitrailer. The fifth wheel coupling comprises a coupling plate, wherein said coupling plate having, inter alia, a bearing surface. This bearing surface of the fifth wheel coupling plate is in particular that surface which is designed for the vehicle to be towed, in particular the semitrailer, to rest on it in a coupled state. Advantageously, the bearing surface is designed to be essentially flat in order to achieve a low surface pressure. By "essentially flat" it is to be understood that the bearing surface is at a maximum distance of 5 cm, preferably at a maximum distance of 2 cm, particularly preferably 1 cm, from an ideal plane. The bearing surface has a normal, in particular an averaged normal. This normal of the trailer surface is in particular such that it is oriented substantially parallel to the vector of the acceleration due to gravity in an installed and coupled idealized state. In other words, this may mean that the normal is oriented, in particular, vertically in an installed and engaged condition. The fifth wheel coupling plate has a retraction opening which extends in the retraction direction. The retraction direction is oriented in particular in such a way that it points in the direction of straight-ahead travel of the vehicle in an engaged and mounted state of the fifth wheel coupling. The retraction opening is designed in particular such that it extends between two coupling horns of the fifth wheel coupling plate. The retraction opening is configured and designed such that a king pin can be retracted therein. The fifth wheel coupling has a locking mechanism which is designed in such a way that, in a closed position, it positively prevents the king pin from being moved out of the insertion opening, in particular in the direction of the insertion direction or counter to the insertion direction, from a coupling position. In particular, the locking mechanism can have or comprise a lock claw which, in the closed position, positively prevents the king pin from being extended from the coupling position. However, should the locking mechanism be displaced, pivoted and/or brought into an open position, extension or retraction of the king pin into/out of the retraction opening is possible. In other words, the locking mechanism serves to positively retain the king pin in the engaged coupling position when the king pin is in the closed position. However, should the locking mechanism be in the open position, the king pin is free to move relative to the fifth wheel coupling plate such that the king pin can be fully retracted or extended into the retraction opening. To transfer the locking mechanism from the closed position to the open position and vice versa, the fifth wheel coupling has an actuating device. The actuating device comprises an actuating area and a transmission area. Advantageously, the actuating area and the transmission area form respective opposite distal ends of the actuating device. Alternatively preferably, however, the actuating area and the transmission area may be implemented in a single portion. In other words, the actuating device may also be formed such that a certain region of the actuating device is both an actuating area and a transmission area. The actuating device extends along a longitudinal axis. The longitudinal axis is therefore in particular the direction in which the length of the actuating device is determined. The actuation area of the actuation device serves to receive actuation forces from a user and/or an actuation actuating device. Advantageously, therefore, the actuation region comprises a handle or other means of engagement for a user. The transmission area of the actuating device, on the other hand, serves to transmit the received actuating forces and/or moments to the locking mechanism. In order to achieve actuation of the actuating device, the latter is in particular such that it is displaceable in an actuating direction. The fifth wheel coupling according to the invention has a safety device. This safety device is in particular such that it can positively prevent an unintentional transfer of the locking mechanism from the closed position to the open position. For positive locking, the safety device comprises a locking means, the locking means being mounted in such a way that the locking means can be moved both into a locking position and into a release position, in particular by means of a pivotable mounting about a pivot axis. The pivot axis about which the locking means can be pivotably mounted can be formed, for example, by a bolt and/or by a screw, for example a fitting screw. Advantageously, this bolt or screw is mounted directly in the fifth wheel coupling plate to achieve a particularly mechanically resilient mounting. The locking means is designed in particular in such a way that, when the locking means is in the locked position, it directly or indirectly positively prevents transfer of the locking mechanism from the closed position to the open position. In this context, "directly positively prevents" means that the locking means itself forms a stop which forms a positive locking. In the case of "indirect positive locking", the locking means is designed in such a way that it interacts with other locking means, which can be formed by parts of the fifth wheel coupling plate, for example, to positively prevent the locking mechanism from being transferred from the closed position to the open position. The locking means can be mounted and/or designed in such a way that it directly contacts elements of the locking mechanism and/or the actuating device in the locked position. By positively preventing the transfer of the locking mechanism from the closed position to the open position by means of the safety device or by the locking means of the safety device, a particularly safe fifth wheel coupling can be achieved.

It is advisable for the locking means to be mounted so that it can swivel exclusively in rotation about the pivot axis. The exclusive rotational mobility of the locking means enables particularly safe locking.

Advantageously, the pivot axis extends transversely to the bearing surface. In this context, "transversely" means that the pivot axis is not located in the plane defined by the bearing surface. By arranging the pivot axis transversely to the bearing surface, a particularly compact fifth wheel coupling arrangement can be achieved.

It is advisable for the pivot axis to be essentially parallel to the normal to the bearing surface. In this way, a particularly secure positive locking can be achieved, because this orientation of the pivot axis makes the locking means particularly insensitive to the vertical vibrations that frequently occur. In other words, this orientation of the pivot axis can achieve a particularly high degree of decoupling of the vibrations about the pivot axis in relation to the vertical vibrations of the vehicle and/or the fifth wheel coupling arrangement. This decoupling or insensitivity to the frequently occurring vertical vibrations therefore leads to a particularly large increase in the safety of the fifth wheel coupling. In this context, "essentially parallel" to the normal of the bearing surface is to be understood as meaning that the smaller angle between the pivot axis and the normal is a maximum of 25°, preferably a maximum of 15°; particularly preferably a maximum of 10° and especially strongly preferred a maximum of 5°. In order to achieve a particularly high degree of decoupling of the vibrations of the locking means about the pivot axis in relation to the vertical vibrations of the fifth wheel coupling or of the vehicle, the pivot axis is advantageously oriented parallel to the normal of the bearing surface.

Preferably, the locking means is mounted on the fifth wheel coupling plate. Bearing on the fifth wheel coupling plate means that the locking means is advantageously supported directly on the fifth wheel coupling plate or is mounted directly on the latter. For example, this can be achieved by the fact that when the locking means is supported by a bolt, by a screw or by a fitting screw, the receiving thread for this means is introduced directly into the fifth wheel coupling plate. By mounting the locking means on the fifth wheel coupling plate, a particularly space-saving and mechanically resilient mounting can be achieved, so that safety can also be increased as a result.

The safety device expediently comprises an actuating device, the actuating device having in particular an energy connection, the actuating device advantageously being designed in such a way that the locking means can be transferred from the locking position to the release position by the actuating device. The actuating device can be, for example, a pneumatic or hydraulic cylinder or an electric motor. The actuating device makes it possible to automatically transfer the safety device, in particular the locking means of the safety device, from the locking position to the release position and/or from the release position to the locking position. A particularly high degree of automation can be achieved by the actuating device, so that operating costs can be saved. In particular, the actuating device has a power connection so that power can be fed to or into the actuating device. Such an energy connection can, for example, be an electrical connection, a compressed air connection or a hydraulic connection.

Advantageously, the safety device, in particular the actuating device, has a pretensioning means, the pretensioning means being designed in particular in such a way that a pretensioning force and/or a pretensioning moment is exerted by the pretensioning means on the locking means in the direction of the locked position. This can further increase the operational safety of the fifth wheel coupling, because the pretensioning means ensures that unintentional actuation is prevented and/or at least made more difficult, for example in the event of a power failure. Such a pretensioning means can be formed, for example, by a helical spring, a torsion spring and/or by an air spring bellows. As already explained, the pretensioning means is designed in particular in such a way that the pretensioning force present in the pretensioning means and/or the pretensioning moment stored therein acts on the locking means in such a way that the locking means is thereby pretensioned into the locking position. In other words, this can mean that the pretensioning means is designed in particular in such a way that it pretensions or presses the locking means into the locking position.

Advantageously, the safety device includes a manual release device. This allows the fifth wheel coupling to be safely released by a user even in the event of a power failure or malfunction. A manual release device may be or include, for example, a hand bar or a safety line. In other words, the manual release device serves to transfer the safety device, in particular its locking means, from the locked position to the release position by means of a user intervention.

Advantageously, the actuating device has a taper section, wherein the taper section tapers, in particular continuously, in the direction of the actuating area, and wherein the taper section is designed to positively prevent transfer of the locking mechanism from the closed position to the open position when the locking means is in the locked position, in particular by means of indirect or direct contact with a part of the fifth wheel coupling plate. In this way, a particularly compact and yet secure positive locking can be achieved. The taper section is thereby an area of the actuating device in which the cross-sectional area of the actuating device is reduced, in particular continuously. In this context, a steady taper means, among other things, that the taper section does not exhibit any abrupt changes in cross-section. For example, this tapering section can be formed by a ramp-shaped and/or s-shaped region. In particular, this taper section is formed in the direction of the actuation area. In other words, this may mean that the taper section is formed such that the cross-sectional area in the region of the taper section becomes smaller in the direction towards the actuating region. By continuously tapering the taper section, a particularly mechanically loadable section can be achieved, because this reduces and/or at least minimizes the notch effect in particular, which is particularly advantageous due to the weakening of the taper section by the tapering there. In addition, this can also prevent unintentional snagging or blocking, so that operational safety can also be increased by a steady formation of the tapered section.

It is expedient that the locking means is designed to be self-locking. This can further increase the safety of the safety device. In this context, a self-locking design can mean, among other things, that when an actuating force is exerted on the actuating device in the actuating direction, a force and/or a moment on the locking means results in the direction of the locking position on the locking means. In other words, this can mean that a self-locking locking means is designed and/or arranged in such a way that, when an attempt is made to transfer the locking mechanism from the closed position to the open position, a force or a moment acts on the locking means, which presses or pretensions it in the direction of the locking position when the locking means is in the locking position.

It is expedient for the locking means to be a locking claw. This type of design makes it possible to achieve a particularly cost-effective and weight-saving construction. A locking claw is to be understood in particular as a hook-shaped element, whereby this hook-shaped element can certainly be angular and/or rounded.

Advantageously, the locking means comprises a contact area, the contact area being adapted to contact or be able to contact the actuating device indirectly and/or directly when the locking means is in the locked position. In other words, the contact area of the locking means may be the area which is adapted to contact the actuating device when the locking means is in the locked position. This indirect or direct contact between the locking means and the actuating device allows a particularly compact and space-saving safety device to be achieved.

In an advantageous embodiment, the locking means is arranged or designed in such a way that the projection of the contact area onto the longitudinal axis is at least partially closer to the actuation area than the projection of the pivot axis of the locking means onto the longitudinal axis. The projection of the pivot axis or of the contact area onto the longitudinal axis is made in particular by an orthogonal projection onto the longitudinal axis. The position in which the locking means is in the locking position is decisive for this projection. This type of arrangement or design of the locking means makes it possible to achieve a self-locking locking means in a particularly simple and cost-effective manner.

Advantageously, the fifth wheel coupling is designed in such a way that transfer of the locking means, in particular in a positive manner, from the release position to the locking position is prevented when the locking mechanism is in the open position, in particular by contact with the actuating device. Through this, a particularly simple and safe operation of the fifth wheel coupling can be achieved, because through this, in particular, an unintentional incorrect operation can be prevented. Such an embodiment of the fifth wheel coupling can be achieved, for example, by the use of sensors and means, wherein the means, in particular electromagnets, prevent a displacement or pivoting of the locking means when the sensors detect that the locking mechanism is in the open position. Alternatively or additionally preferably, this can also be achieved by the actuating device and/or the locking means being designed and/or arranged in such a way that, in particular by an area of the actuating device, a transfer of the locking means into the locking position is prevented in a positive manner when the locking mechanism is in the open position.

Expediently, the fifth wheel coupling has a disengaging cylinder, wherein the disengaging cylinder is arranged and designed in such a way that the actuating device can be displaced indirectly and/or directly in the actuating direction by the disengaging cylinder. By providing a disengaging cylinder, an automatic transfer of the locking mechanism from the closed position to the open position or vice versa can be achieved. Therefore, by providing such a disengaging cylinder, the degree of automation of the fifth wheel coupling can be increased, which is particularly advantageous with regard to autonomous driving.

BRIEF DESCRIPTION OF THE DRAWINGS

Further advantages and features of the present invention will be apparent from the following description with reference to the Figures. Individual features of the embodiments shown can thereby also be used in other embodiments, unless this has been expressly excluded. Showing:

FIG. 1 is a bottom view of a fifth wheel coupling according to the invention;

FIG. 2 is a side view of a fifth wheel coupling according to the invention;

DETAILED DESCRIPTION OF THE PREFERRED EMBODIMENTS

Figure 3:
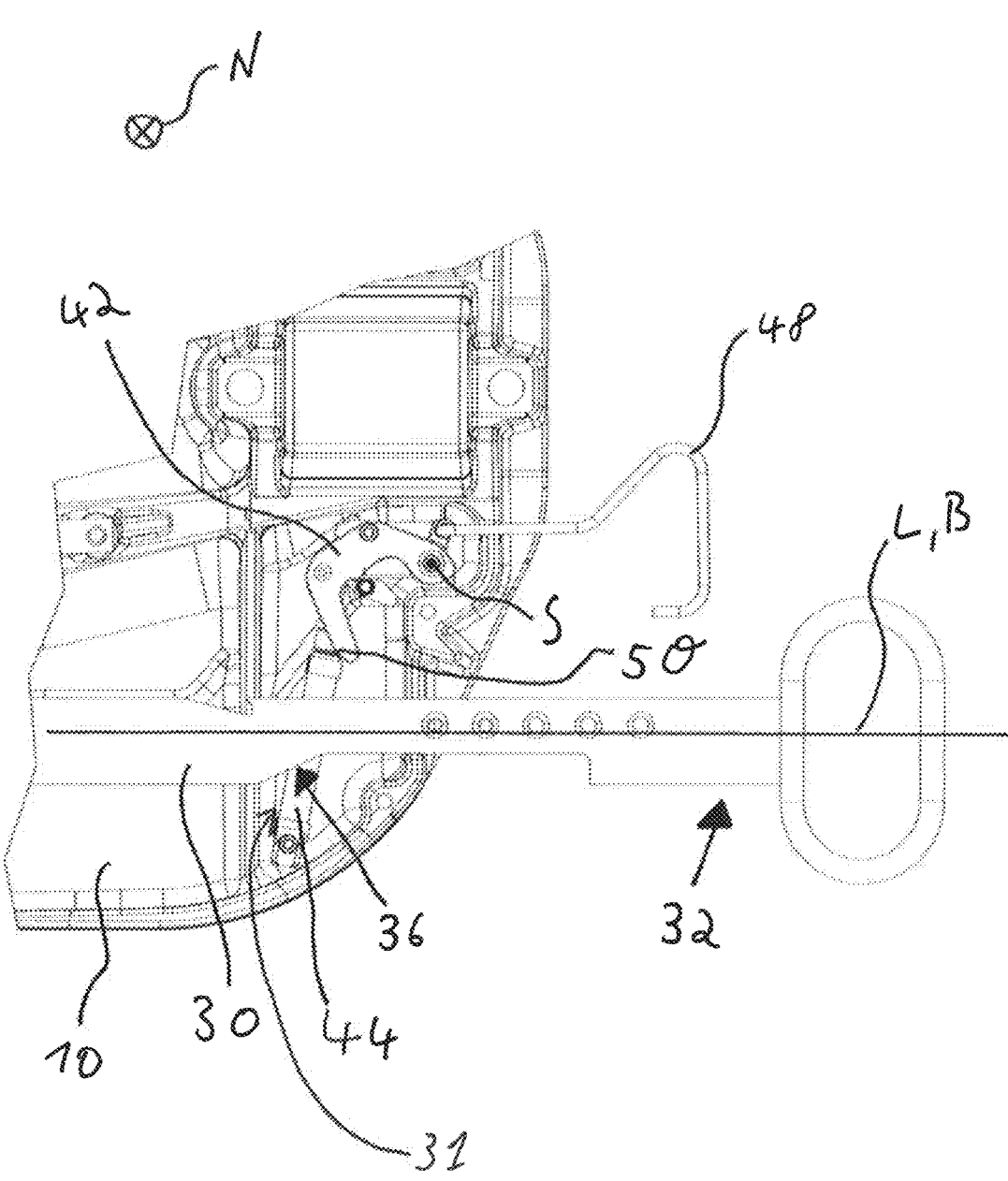
FIG. 3 is a detailed view of a fifth wheel coupling in the area of the safety device, wherein the safety device being in the locked position.

In FIG. 1, a fifth wheel coupling 1 is shown, wherein the fifth wheel coupling 1 has a fifth wheel coupling plate 10. The fifth wheel coupling plate 10 is shown from below in FIG. 1, so that the bearing surface of the fifth wheel coupling plate is not visible in FIG. 1. However, the normal N of the bearing surface is schematically shown in FIG. 1. The fifth wheel coupling plate 10 has a retraction opening 14 between two fifth wheel horns, which extends in the retraction direction E. In FIG. 1, the fifth wheel coupling 1 is shown in such a way that the locking mechanism 20 is in the closed position, so that disengagement or extension of the king pin against the retraction direction E from the retraction opening 14 is positively prevented by the locking mechanism 20. The locking mechanism 20 can be transferred from the closed position to the open position via the actuating device 30. This can be achieved, for example, by the disengagement cylinder 80 or by manual actuation of the actuating device 30. For this purpose, the actuating device 30 has an actuating area 32, which can be formed, for example—as in FIG. 1—by a manual engagement eyelet. The actuating device 30 can be displaced in the actuating direction B in order to transfer the locking mechanism 20 from the closed position to the open position. In order to transmit these forces or moments from the actuating device 30 to the locking mechanism 20, the actuating device 30 has a transmission area 34. In the embodiment example shown, the actuating direction B corresponds to the longitudinal axis L in which the actuating device 30 extends. Approximately centrally between the transmission area 34 and the actuation area 32, the actuation device 30 has a taper section 36, wherein in the taper section 36 the cross-section of the actuation device 30 tapers continuously in the direction of the actuation area 32. In order to achieve positive locking of the locking mechanism 20 or the actuating device 30, the fifth wheel coupling 1 has a safety device 40. This safety device 40 has a locking means 42, which is mounted so as to be pivotable about the pivot axis S. In the situation shown in FIG. 1, the pivot axis S is oriented parallel to the normal N of the bearing surface 12. In order to achieve automatic actuation of the locking means 42 of the safety device 40, the safety device 40 has an actuating device 44 in the form of a compressed air cylinder. However, in order to also achieve a manual transfer of the locking means 42 from the locking position shown in FIG. 1 to the release position, the safety device 40 also has a manual release device 48 in the form of a manual handle. The actuating device 30 includes an energy connection or power connection 31 so that power can be fed to or into the actuating device 30. Such an energy connection 31 can, for example, be an electrical connection, a compressed air connection or a hydraulic connection.

FIG. 2 shows a side view of a fifth wheel coupling 1. The fifth wheel coupling 1 has a fifth wheel coupling plate 10, which in turn has a bearing surface 12. This bearing surface 12 has a normal N.

FIG. 3 shows a detailed view of the fifth wheel coupling 1 in the area of the safety device 40. In FIG. 3, the locking means 42 is in the release position. The locking means 42 is mounted to pivot about the pivot axis S relative to the fifth wheel coupling plate 10 by means of a pin forming the pivot axis S. The locking means 42 is configured as a locking claw and has a contact area 50. This contact area 50 is designed to contact and/or be able to contact directly with parts of the actuating device 30 in the locked position. The actuating device 30 extends in the direction of the longitudinal axis L, wherein this longitudinal axis L is parallel or at least substantially parallel to the actuating direction B. In principle, the detailed view shown in FIG. 3 can thereby belong to the fifth wheel coupling 1 shown in FIG. 1 and/or to the fifth wheel coupling 1 shown in FIG. 2.

Figure 4:
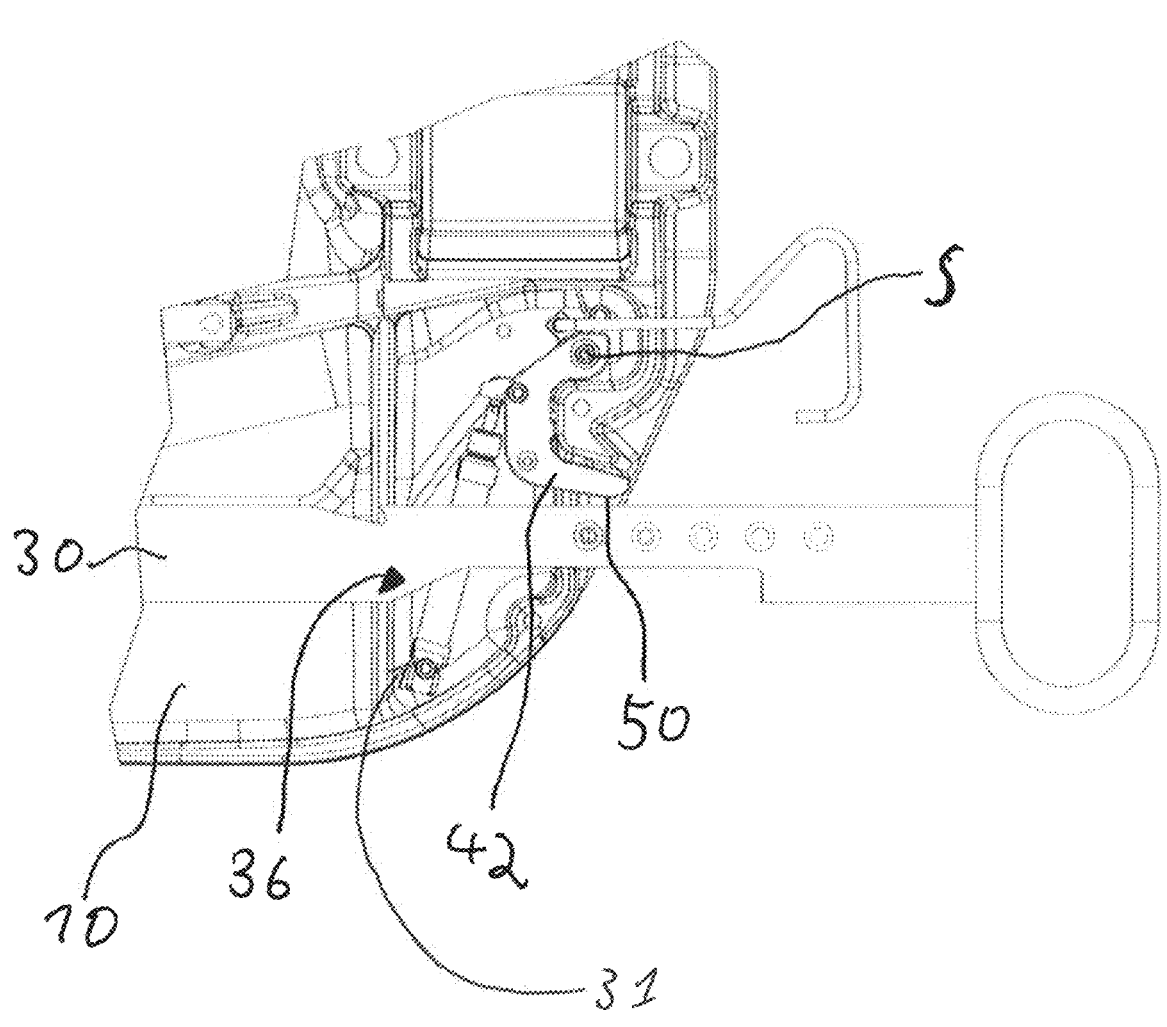
FIG. 4 is a detailed view of a fifth wheel coupling in the area of the safety device, wherein the safety device is in the release position.

FIG. 4 shows the situation already depicted in FIG. 3, wherein in FIG. 4 the locking means 42 is in the locked position. As can be seen from FIG. 4, displacement of the actuating device 30 in the actuating direction B is thereby positively prevented by the interaction of the locking means 42 with the tapered section 36 of the actuating device 30 and with the fifth wheel coupling plate 10. Therefore, FIG. 4 shows an embodiment of the invention in which the locking means in the locked position indirectly positively prevents transfer of the locking mechanism 20 from the closed position to the open position.

LIST OF REFERENCE SIGNS

1—Fifth wheel coupling
10—Fifth wheel coupling plate
12—Bearing area
14—Retraction opening
20—Locking mechanism
30—Actuating device
32—Actuating area
34—Transmission area
36—Taper section
40—Safety device
42—Locking means 44—Actuating device
46—Pretensioning agent
48—Manual release device
50—Contact area
80—Disengaging cylinder
B—direction of actuation
E—retract direction
L—longitudinal axis
N—normal of the bearing surface
S—pivot axis

The invention claimed is:

1. A fifth wheel coupling, comprising:
a fifth wheel coupling plate having a bearing surface and a retraction opening for a king pin, wherein the bearing surface has a normal, and wherein the retraction opening extends in a retraction direction;
a locking mechanism configured such that, in a closed position, the locking mechanism indirectly and/or directly prevents the king pin from being extended out of the retraction opening in a positive-locking manner, and wherein the locking mechanism in an open position allows the king pin to be extended from the retraction opening;
an actuating device comprising an actuating area including a handle, and a transmission area, wherein the actuating device extends along a longitudinal axis, wherein the actuating device is configured to transfer the locking mechanism from the closed position to the open position by a displacement of the actuating device in a direction of actuation, and wherein the transmission area is configured to transmit forces and/or moments to the locking mechanism indirectly or directly; and
a safety device comprising a locking arrangement pivotably mounted about a pivot axis such that the locking arrangement can be moved into a locking position and into a release position, wherein the locking arrangement in the locking position positively prevents a transfer of the locking mechanism from the closed position to the open position, wherein the pivot axis is substantially parallel to the normal, and wherein the locking arrangement is mounted to the fifth wheel coupling plate.

2. The fifth wheel coupling according to claim 1, wherein the locking arrangement is exclusively rotatably pivotable about the pivot axis.

3. The fifth wheel coupling according to claim 2, wherein the safety device further comprises an actuating device, wherein the actuating device has an energy connection, and wherein the actuating device is configured such that the locking arrangement can be transferred from the locking position to the release position by the actuating device.

4. The fifth wheel coupling according to claim 3, wherein the safety device further comprises a pretensioning arrangement configured such that a pretensioning force and/or a pretensioning moment is exerted by the pretensioning arrangement on the locking arrangement in the direction of the locking position.

5. The fifth wheel coupling according to claim 4, wherein the safety device further comprises a manual release device.

6. The fifth wheel coupling according to claim 5, wherein the actuating device further includes a taper section that tapers toward the actuation area, and wherein the taper section is configured to positively prevent a transfer of the locking mechanism from the closed position to the open position, when the locking arrangement is in the locked position, by contact with a part of the fifth wheel coupling plate.

7. The fifth wheel coupling according to claim 5, wherein the locking arrangement is configured such that the locking arrangement is self-locking.

8. The fifth wheel coupling according to claim 7, wherein the locking arrangement includes a locking claw.

9. The fifth wheel coupling according to claim 8, wherein the locking arrangement includes a contact area configured to be engaged when the locking arrangement is in the locked position, contacting the actuating device indirectly or directly.

10. The fifth wheel coupling according to claim 9, wherein a projection of the contact area onto the longitudinal axis is at least partially closer to the actuation area than a projection of the pivot axis onto the longitudinal axis, when the locking arrangement is in the locked position.

11. The fifth wheel coupling according to claim 10, wherein the fifth wheel coupling is configured such that a transfer of the locking arrangement by positive locking from the release position to the locked position is prevented when the locking mechanism is in the open position.

12. The fifth wheel coupling according to claim 1, further comprising:

a disengaging cylinder arranged and configured such that the actuating device can be displaced indirectly and/or directly in the direction of actuation by the disengaging cylinder.

13. The fifth wheel coupling according to claim 1, wherein the safety device further comprises an actuating device, wherein the actuating device has an energy connection, and wherein the actuating device is configured such that the locking arrangement can be transferred from the locking position to the release position by the actuating device.

14. The fifth wheel coupling according to claim 1, wherein the safety device further comprises a pretensioning arrangement configured such that a pretensioning force and/or a pretensioning moment is exerted by the pretensioning arrangement on the locking arrangement in the direction of the locking position.

15. The fifth wheel coupling according to claim 1, wherein the safety device further comprises a manual release device.

16. The fifth wheel coupling according to claim 1, wherein the actuating device further includes a taper section that tapers toward the actuation area, and wherein the taper section is configured to positively prevent a transfer of the locking mechanism from the closed position to the open position, when the locking arrangement is in the locked position, by contact with a part of the fifth wheel coupling plate.

17. The fifth wheel coupling according to claim 1, wherein the locking arrangement is configured such that the locking arrangement is self-locking.

18. The fifth wheel coupling according to claim 1, wherein the locking arrangement includes a locking claw.

19. The fifth wheel coupling according to claim 1, wherein the locking arrangement includes a contact area configured to be engaged when the locking arrangement is in the locked position, contacting the actuating device indirectly or directly.

20. The fifth wheel coupling according to claim 19, wherein a projection of the contact area onto the longitudinal axis is at least partially closer to the actuation area than a projection of the pivot axis onto the longitudinal axis, when the locking arrangement is in the locked position.

* * * * *